Feb. 11, 1958    M. N. FAIRBANK    2,823,317
PHOTOGRAPHIC APPARATUS
Filed April 5, 1952    3 Sheets-Sheet 1

INVENTOR
Murry N. Fairbank
BY Brown and Mikulka
and
Gerald Altman
ATTORNEYS

Feb. 11, 1958  M. N. FAIRBANK  2,823,317
PHOTOGRAPHIC APPARATUS

Filed April 5, 1952  3 Sheets-Sheet 3

INVENTOR
Murry N. Fairbank
BY Brown and Mikulka
and
Gerald Altman
ATTORNEYS

United States Patent Office 2,823,317
Patented Feb. 11, 1958

2,823,317

PHOTOGRAPHIC APPARATUS

Murry N. Fairbank, Belmont, Mass., assignor to Polaroid Corporation, Cambridge, Mass., a corporation of Delaware Application April 5, 1952, Serial No. 280,716

16 Claims. (Cl. 250—68)

This invention relates to photography and more particularly to magazines wherein photosensitive sheets may be exposed and processed.

An object of the present invention is to provide a durable magazine for use in photography and comprising a casing having rigid edge portions and a pair of opposed face portions, at least one of said face portions including a resilient diaphragm, said casing defining a chamber within which a photosensitive sheet may be exposed and processed, at least one of said face portions providing a path through which radiation may be transmitted in order to expose said photosensitive sheet, said diaphragm maintaining said chamber lighttight in an illuminated environment while transmitting opposed compressional forces into said chamber from pressure-applying means on opposite sides of said casing, whereby a layer of processing composition may be spread over at least a surface of said photosensitive sheet.

Other objects of the invention are to provide a magazine of the above type wherein guide means are provided for predeterminedly positioning a photosensitive sheet and another sheet in superposed relation within said chamber, said diaphragm overlying said sheets so as to enable transmission of opposed compressional forces to remote surfaces of said sheets and spreading of a layer of processing composition between the adjacent surfaces thereof; to provide a magazine of the aforementioned type comprising opposed face portions, each of which includes a resilient diaphragm; and to provide a magazine of the above type comprising opposed face portions, one of said face portions being provided with an aperture, and a dark slide, said dark slide permitting passage of light through said aperture when in open position and rendering said passage lighttight when in closed position, either the other face portion or said dark slide including a resilient diaphragm.

Further objects of the invention are to provide a magazine of the aforementioned type which is particularly adapted for effectuating X-ray photography and which mounts an intensifying screen therewithin, the intensifying screen being removable therefrom through a lighttight passage; and to provide in combination with such a magazine and intensifying screen a pressure-applying means which is adapted to hold the photosensitive sheet and intensifying means in intimate contact during exposure.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
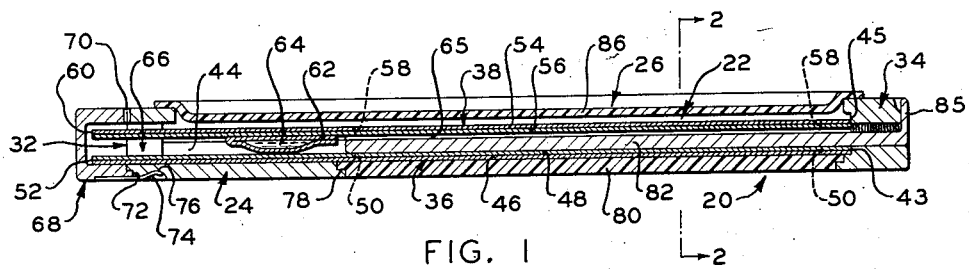
Figure 1 is an exaggerated, sectional view of an embodiment of the herein disclosed invention, the section being taken midway between the longitudinal edges thereof.
Figure 2:
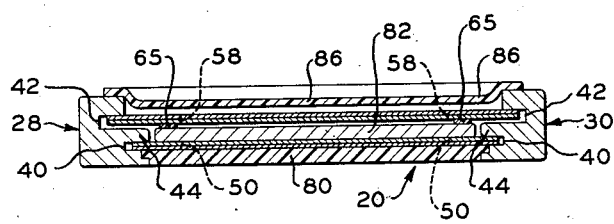
Fig. 2 is a cross-sectional view, taken substantially along the line 2—2 of Fig. 1.

Lighttight photographic magazines have been proposed for holding photosensitive sheets during transportation thereof between dark room and camera. Customarily, such a magazine may be removably attached to a camera, the magazine, when so attached, being adapted to position a photosensitive sheet held thereby in the focal plane of the camera and to transmit actinic radiation from the lens of the camera to a photosensitive sheet so positioned. The present invention contemplates a novel magazine which is capable of performing the aforementioned functions and which, additionally, is so constructed as to enable processing of the photosensitive sheet therewithin. Generally, a magazine embodying the present invention comprises a casing defining a chamber for holding a photosensitive sheet and having rigid and durable edge portions that facilitate predetermined positioning of the casing with respect to a camera with which it is associated. The casing is provided with a pair of face portions, at least one of which permits exposure of said photosensitive sheet to actinic radiation and at least one of which includes a resilient diaphragm which is adapted to maintain the chamber lighttight in an illuminated environment and to transmit opposed compressional forces into the chamber in order to spread a processing composition between the photosensitive sheet and another sheet also positioned within the chamber. The photosensitive sheet, for example, may comprise a silver halide layer. In one form thereof, the second sheet comprises a silver precipitating layer. The processing composition may comprise a developer, a silver halide solvent and an alkali. The result of spreading processing composition between the sheets is to develop the latent image on the photosensitive sheet to silver in order to form in a frame of the photosensitive sheet a soluble silver complex from unexposed silver halide for transfer to the other sheet. This complex, at least in part, may be transferred my imbibition to an area of the other sheet where it may be developed to silver to produce a positive image.

The photographic process employed by the herein disclosed magazine and various species of photosensitive and other sheets above referred to are described in detail in Patent No. 2,543,181, issued to Edwin H. Land on February 27, 1951 for Photographic Product Comprising a Rupturable Container Carrying a Photographic Processing Liquid and in application Serial No. 7,795, now Patent No. 2,746,056, filed by Edwin H, Land on February 12, 1948 for Photographic Process. It is to be understood, however, that a product embodying the herein described invention is not limited to any particular species of photosensitive or other sheets, the terms "photosensitive sheet" and "other sheet" being used in their broadest sense to indicate a first sheet which is photosensitive and a second sheet which merely may aid in spreading the processing liquid over the surface of the photosensitive sheet or which may, if desired, possess other characteristics.

Referring now to the drawings, wherein like numerals denote like parts, there is illustrated in Figs. 1, 2, 3 and 4 a magazine which embodies the present invention and which is particularly adapted for use in X-ray photography. The magazine comprises a causing, generally designated at 20, said casing defining a chamber 22 within which a photosensitive sheet is adapted to be exposed and thereafter processed. Casing 20 comprises edge portions 28, 30, 32 and 34, a front face portion 24, and a rear face portion 26.

In accordance with the present invention, edge portions 28, 30, 32 and 34 are of rigid and durable construction so as to provide a serviceable, convenient frame which facilitates predetermined positioning of casing 20 with respect to the photographic apparatus with which it is associated. Edge portions 28, 30, 32 and 34 may be composed of any suitable material, such as wood, synthetic plastic, metal, etc., which possesses the aforementioned characteristics of rigidity and durability, and which, additionally, is opaque to ordinary light.

Associated with edge portions 28 and 30 are a pair of suitable guide means for predeterminedly positioning a photosensitive sheet 36 and another sheet 38 within chamber 22. In the illustrated embodiment, as guide means for photosensitive and other sheets 36 and 38, there are formed (Fig. 2), in opposite edge portions 28 and 30, the pairs of grooves 40 and 42, each groove 40 being separated from each groove 42 by a rail 44. It is to be noted that grooves 42 extend farther toward the extremities of edge portions 28 and 30 than do grooves 40 and that rails 44 extend along edge portions 28 and 30 to a position adjacent the extremity of edge portion 32 (Fig. 1). Viewing Fig. 1, movement of sheets 36 and 38 to the right is limited by abutments 43 and 45, respectively.

Photosensitive sheet 36 is shown mounted in grooves 40 for exposure and processing within chamber 22. As shown, photosensitive sheet 36 includes a suitable base 46 and a suitable photosensitive layer 48 on one side of base 46, the photosensitive layer providing a frame, shown in dotted lines at 50, which is adapted to receive a latent image upon photoexposure. Sheet 36 extends to the left of frame 50, viewing Fig. 1, to form a tab 52. The photosensitive layer, for example, may be composed of a silver halide emulsion which is adapted to receive a latent image upon exposure to X-radiation passing through face portion 24 and base 46.

Sheet 38, in conjunction with which sheet 36 may be processed, is shown to be greater in width than sheet 36 and is mounted in grooves 42. Sheet 38 preferably comprises a base 54 and a suitable image-receiving layer 56 on one side of base 54. Layer 56 provides an image-receiving area 58 which is adapted to be superposed on frame 50 and which is separated from the remainder of layer 56 by a series of perforations extending through sheet 38. Sheet 38 extends to the left of area 58, viewing Fig. 1, to form a tab 60 which is adapted to be aligned with tab 52. The image-receiving layer, for example, may comprise one of the compositions, now well known in the art, which adapt it to receive a positive print of a latent image that has been formed in frame 50. Such means as a container 62 is provided for carrying a liquid processing composition 64. As shown, container 62 is affixed to sheet 38 at an edge of area 58. Container 62 is provided with a rupturable mouth, facing area 58, which is adapted to eject processing composition 64 for spreading between frame 50 and area 58 when opposed compressional forces are applied to the container 62. On opposite sides of area 58, there are affixed to sheet 38 a pair of strips 65 of predetermined compressibility which assure that processing composition 64 is spread between frame 50 and area 58 in a uniform layer of predetermined thickness.

In the illustrated embodiment, edge portion 32 defines a passage 66 through which sheets 36 and 38 may be inserted into chamber 22. As a closure means for rendering passage 66 lighttight, a cover 68, pivoted to edge portion 32 by such means as a flexible, lighttight hinge 70, may be provided. Additional light seal means, illustrated in Fig. 1 as at 72, are provided. Latch means, in one form thereof comprising a resilient tongue 74 affixed to cover 68 and a notch 76 in edge portion 32, are provided for securing the cover 68 in closed position.

In the illustrated embodiment, face portion 24 provides a path through which X-radiation is adapted to pass in order to expose a photosensitive sheet retained by grooves 40. Accordingly, face portion 24 may be composed of any suitable material, such for example as wood or synthetic plastic, which is opaque to ordinary light but which is substantially transparent to X-radiation. Face portion 24 also may be composed of a suitable metal, in which case it is cut out as at 78 to provide a path through which X-radiation may be transmitted, such means as an opaque wood or synthetic plastic panel 80 being provided to render face portion 24 lighttight.

In X-ray photography, it is frequently desirable to intensify the actinic effect of X-radiation on the photosensitive sheet being exposed thereto. Intensification may be accomplished by an intensifying screen composed of one of the many suitable materials known in the art. In the illustrated embodiment, an intensifying screen 82 is provided which normally is positioned within chamber 22 adjacent to photosensitive sheet 36. Edge portion 34 of casing 20 is provided with a lighttight passage 84 through which screen 82 normally extends and through which screen 82 may be removed from chamber 22 after exposure of sheet 36 to X-radiation. Passage 84 may be rendered lighttight by such conventional material as, for example, felt or closely spaced bristles. Such means as a lug 85 is provided for limiting movement of screen 82 in to chamber 22 so as to prevent unnecessary disturbance of container 62.

Figure 3:
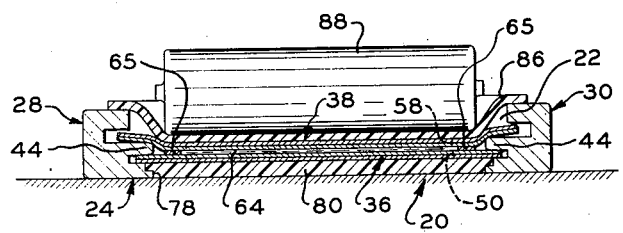
Fig. 3 is a view, similar to that of Fig. 2, illustrating the operation of the embodiment of Figs. 1 and 2.
Figure 4:
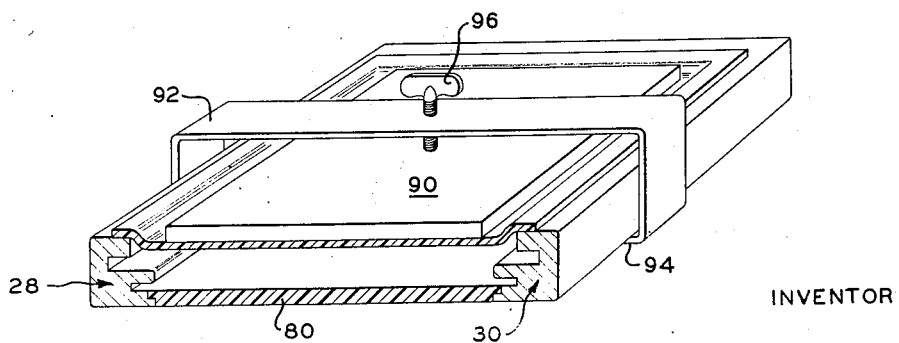
Fig. 4 is a perspective view of a device usable in conjunction with the embodiment of Figs. 1 and 2.

Fig. 3 illustrates the manner in which sheets 36 and 38 may be processed within chamber 22 after removal of screen 82 therefrom. In accordance with the present invention, rear face portion 26 includes a diaphragm 86 composed of an opaque resilient material which is adapted to exclude light from chamber 22 in an illuminated enviroment while enabling transmission of opposed compressional forces to the remote surfaces of sheets 36 and 38.

Diaphragm 86 may be composed of any suitable resilient material such as one of rubber, synthetic plastic of flexible metal. Sheets 36 and 38 are so constructed that when they are properly positioned within chamber 22, frame 50, area 58, which is superposed thereon, and container 62 underlie diaphragm 86. The pressure-applying means for producing the opposed compressional forces is shown in Fig. 3 as a roller 88 and any stable base against which face portion 24 is adapted to abut. When roller 88 is advanced over the surface of diaphragm 86 from left to right, viewing Fig. 1, the sealed mouth of container 62 is ruptured and processing composition 64 is ejected between sheets 36 and 38 for spreading. Continued advancement of roller 88 over diaphragm 86, as illustrated in Fig. 3, causes spreading of a layer of processing composition 64 between frame 50 and area 58, the thickness of the layer being determined by the thickness of spacer strips 65. Frame 50 and area 58 preferably are allowed to remain in superposition with the layer of processing composition spread therebetween for a predetermined processing period during which the latent image of frame 50 is processed and a positive print is formed in area 58. At the end of the processing period, an operator may open cover 68 and, by grasping aligned tabs 52 and 60, may withdraw sheets 36 and 38 from chamber 22. Area 58 may then be ripped from the remainder of sheet 38, with the aid of the perforations separating it from the remainder of sheet 38, and at the same time peeled from sheet 36.

An intensifying screen, in X-ray photography, is most effective when it is in intimate contact with a photosensitive layer being exposed. In order to press photosensitive layer 48 into contact with intensifying screen 82 during exposure, pressure-applying means may be provided. In the illustrated embodiment (Fig. 4), the pressure-applying means comprises a platen 90 having a pressure face substantially equal in area to frame 50. Associated with platen 90 is a U-shaped clasp 92 having feet 94 which are adapted to abut against edge portions 28 and 30 and having a wing nut 96 which is adapted to act through diaphragm 86 to press screen 82 against frame 50. In practice, platen 90 is positioned adjacent the right end of diaphragm 86, viewing Fig. 1, so that it will not exert pressure on container 62.

The operation of the magazine of Figs. 1, 2, 3 and 4 is as follows. Cover 68 is opened in a dark room and sheets 36 and 38 are positioned in their respective pairs of grooves 40, 40 and 42, 42 with tabs 52 and 60 aligned. Screen 82 is interposed between sheets 36 and 38 with one of its ends extending through passage 84. Cover 68 now is closed and platen 90 clamped against diaphragm 86 so that screen 82 is pressed into contact with frame 50. Frame 50 now may be exposed through face portion 24 to X-radiation and to actinic radiation emanating from screen 82 as a result of excitation thereof by said X-radiation. Platen 90 now is removed from contact with diaphragm 86 and screen 82 withdrawn from chamber 22. Roller 88 now may be applied to diaphragm 86 in an illuminated environment in order to rupture the mouth of container 62 and to spread processing composition 64 between frame 50 and area 58. At the end of a predetermined time, during which the latent image in frame 50 has been processed and a positive print has formed in area 58, sheets 36 and 38 may be removed from chamber 22 and area 58 may be ripped from the remainder of sheet 38 and peeled from sheet 36.

Figure 5:
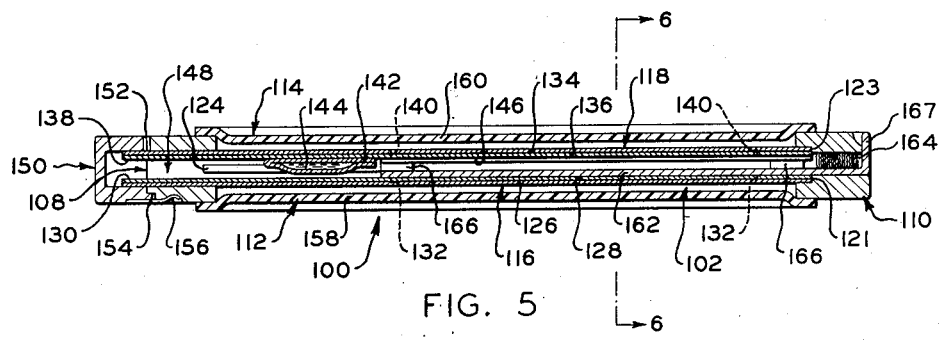
Fig. 5 is an exaggerated sectional view of another embodiment of the herein disclosed invention, the section being taken midway between the longitudinal edges thereof.
Figure 6:
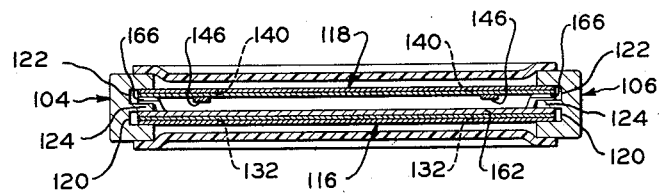
Fig. 6 is a cross-sectional view, taken substantially along the line 6—6 of Fig. 5.
Figure 7:
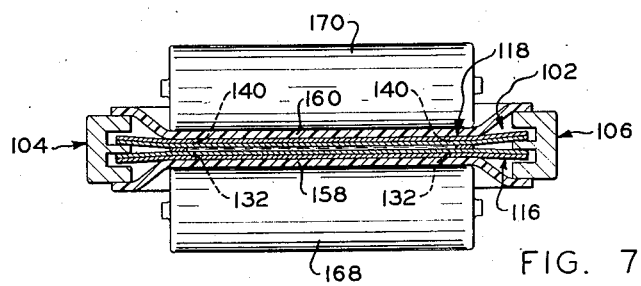
Fig. 7 is a view, similar to that of Fig. 6, illustrating the operation of the embodiment of Figs. 5 and 6.

Another example of a magazine which embodies the present invention and which is particularly adapted for use in X-ray photography is shown in Figs. 5, 6 and 7. The magazine comprises a casing, generally designated at 100, which is similar to the casing illustrated in Figs. 1, 2, 3 and 4. Casing 100 defines a chamber 102 and comprises edge portion 104, 106, 108 and 110 and face portions 112 and 114.

In accordance with the present invention, edge portions 104 and 106 are composed of any suitable material possessing the characteristics of rigidity, durability and opacity. Associated with edge portions 104 and 106 are suitable guide means for predeterminedly positioning a photosensitive sheet 116 and another sheet 118 within chamber 102. In the form shown, the guide means for sheets 116 and 118 are pairs of grooves 120, 120 and 122, 122, respectively, which are equal in depth and which are formed in opposite edge portions 104 and 106 (Fig. 6). Viewing Fig. 6, movement of sheets 116 and 118 to the right is limited by abutments 121 and 123, respectively. Separating grooves 120 from grooves 122 are a pair of rails 124 which extend along edges 104 and 106 to a position adjacent edge portion 108.

Photosensitive sheet 116 and other sheet 118 are illustrated as being substantially similar to the above-described sheets 36 and 38, respectively. Thus, photosensitive sheet 116 comprises a base 126, a suitable photosensitive layer 128 on one side of base 126 and a tab portion 130. The photosensitive layer provides a frame, shown in dotted lines at 132, which is adapted to receive a latent image upon photoexposure. Sheet 118, in conjunction with which photosensitive sheet 116 may be processed, is equal in width to sheet 116 and comprises a base 134, a suitable image-receiving layer 136 on one side of base 134 and a tab portion 138. Layer 136 provides an image-receiving area 140 which is adapted to be superposed on frame 132 and which is separated from the remainder of layer 136 by a series of perforations through sheet 118. Such means as a container 142 is provided for carrying a liquid processing composition 144. As shown, container 142 is affixed to layer 136 at an edge of area 140. Container 142 is provided with a rupturable mouth, facing area 140, which is adapted to eject processing composition from container 142 when opposed compressional forces are applied thereto. A pair of spacer strips 146 of predetermined compressibility are affixed to layer 136 on opposite sides of area 140.

Edge portion 108 provides a passage 148 through which sheets 116 and 118 may be inserted into chamber 102. A cover 150, pivoted to edge portion 108 by such means as a flexible, opaque hinge 152, is provided for rendering passage 148 lighttight. Also provided are suitable light seal means 154 for preventing light leakage between cover 150 and edge portion 108 and suitable latch means 156 for securing cover 150 in closed position.

In the alternative embodiment of Figs. 5, 6 and 7, face portions 112 and 114 include a pair of diaphragms 158 and 160, respectively. Diaphragm 158 provides a path through which X-radiation is adapted to pass in order to expose a photosensitive sheet 116 retained by grooves 120. Both diaphragms 158 and 160 are adapted to transmit opposed compressional forces to the remote surfaces of sheets 116 and 118 from pressure-applying means on opposite sides of casing 100 in an illuminated environment while excluding light from chamber 102. As shown, diaphragms 158 and 160 comprise resilient sheets of any suitable material, such for example as one of rubber, synthetic plastic and flexible metal. If diaphragms 158 and 160 are composed of sheet metal, it is preferable that they be relatively thin in order not to appreciably attenuate X-radiation passing therethrough.

Such means as an intensifying screen 162 is provided for increasing the actinic effect of X-radiation to which sheet 116 is being exposed. Edge portion 110 is provided with a lighttight passage 164 through which screen 162 normally extends and through which screen 162 may be removed from chamber 102 after exposure of sheet 116 to X-radiation. As a means for guiding screen 162 into and out of operating position adjacent sheet 116, the edges of screen 162 are provided with lugs 166 which are adapted to engage guide rails 124. Passage 164 may be rendered lighttight by such conventional materials as, for example, felt or closely spaced bristles. Such means as a lug 167 is provided for limiting movement of screen 162 into chamber 102 so as to prevent unnecessary disturbance of container 142.

In order to press photosensitive layer 128 into intimate contact with intensifying screen 162 for exposure, there may be associated with casing 100 a pressure-applying means of the type illustrated in Fig. 3.

Fig. 7 illustrates the manner in which sheets 116 and 118 may be processed within casing 100 after removal of screen 162 therefrom. Sheets 116 and 118 are so constructed that when they are properly positioned within chamber 102, area 140, frame 132 and container 142 are interposed between diaphragm 158 and diaphragm 160. As a means for producing opposed compressional forces for rupturing the mouth of container 142 and spreading processing composition 144 between frame 132 and area 140, a pair of rollers 168 and 170, shown schematically in Fig. 7, may be provided. Casing 100 may be advanced between rollers 168 and 170 in such a manner that the rollers act through diaphragms 158 and 160 to produce the compressional forces necessary to spread processing composition 144 between frame 132 and area 140.

The operation of the embodiment illustrated in Figs. 5, 6 and 7 is substantially similar to that of the embodiment illustrated in Figs. 1, 2, 3 and 4.

Figure 8:
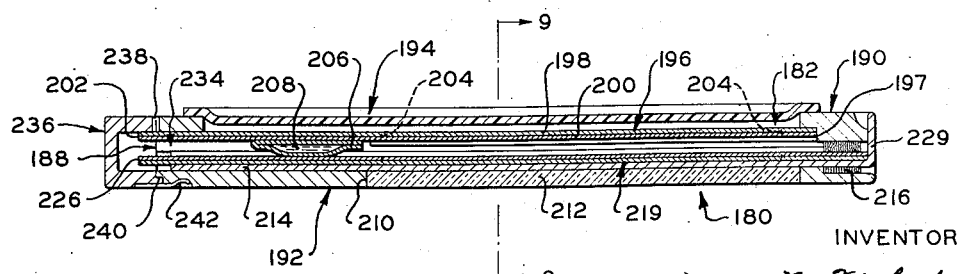
Fig. 8 is an exaggerated, sectional view of a further embodiment of the herein disclosed invention, the section being taken midway between the longitudinal edges thereof.
Figure 9:
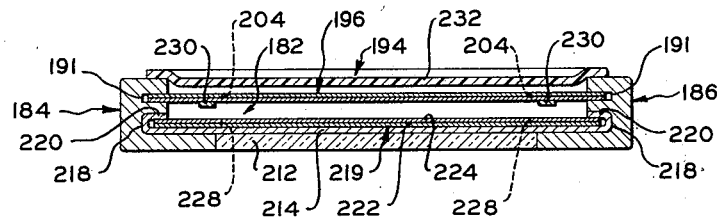
Fig. 9 is a cross-sectional view, taken substantially along the line 9—9 of Fig. 8.

In Figs. 8 and 9, there is illustrated a magazine embodying the present invention and usable in conjunction with a suitable camera of conventional design. The magazine comprises a casing, generally designated at 180, which defines a chamber 182 and comprises edge portions 184, 186, 188 and 190, front face 192 and rear face 194.

In accordance with the present invention, edge portions 184, 186, 188 and 190 are composed of any suitable material possessing the characteristics of rigidity, durability and opacity. Associated with edge portions 184 and 186 is a suitable guide means, shown in Fig. 9 as a pair of grooves 191, for predeterminedly positioning a photosensitive sheet 196 within chamber 182. Viewing Fig. 8, an abutment 197 is provided for limiting movement of sheet 196 to the right.

Photosensitive sheet 196 is shown in Figs. 8 and 9 mounted in grooves 191 for exposure and processing within chamber 182. As shown, sheet 196 includes a base 198, a suitable photosensitive layer 200 on one side of base 198 and a tab portion 202. Layer 200 provides a frame, shown in dotted lines at 204, which is adapted to receive a latent image upon photoexposure. In the form shown, sheet 196 has affixed thereto, adjacent an edge of frame 204, a container 206 for carrying a liquid processing composition 208. Container 206 is provided with a rupturable mouth, facing frame 204, which is adapted to eject processing composition 208 from container 206 when opposed compressional forces are applied thereto.

As shown, front face portion 192 provides an optical aperture 210 through which light from the lens of a camera with which the magazine is associated may pass in order to expose frame 204. A window 212, composed of a suitable material such as optically clear glass or plastic, is positioned within aperture 210.

A dark slide, designated herein at 214, is provided for rendering aperture 210 lighttight when in closed position and for permitting transmission of light through window 212 when in open position. In the illustrated embodiment, edge portion 190 is provided with a lighttight passage 216 through which a portion of slide 214 normally extends and through which slide 214 may be removed from chamber 182. For guiding slide 214 into open and closed position, edge portions 184 and 186 are provided with a pair of grooves 218 (Fig. 9) which are adapted to receive the opposite edges of slide 214.

In the form shown, a sheet 219, in conjunction with which photosensitive sheet 196 may be processed, may be secured to the inner surface of slide 214 as by means of inturned flanges 220. Sheet 219 preferably comprises a base 222, a suitable image-receiving layer 224 on one side of base 222 and a tab 226. Layer 224 provides an image-receiving area 228 which is adapted to be superposed on frame 204 and which is separated from the remainder of layer 224 by a series of perforations through sheet 219. A pair of spacer strips 230 are affixed to sheet 196 on opposite sides of frame 204. After exposure of frame 204 through window 212, sheet 219 may be mounted on the inner surface of slide 214 and, by moving slide 214 into closed position, may be aligned with sheet 196. Slide 214 is provided with a lug 229 which, viewing Fig. 8, limits movement of slide 214 to the left and limits movement of sheet 219 to the right.

In accordance with the present invention, rear face 194 is provided with an opaque, resilient diaphragm 232 of the type heretofore described in detail. The edges of sheet 196 may be so retained in grooves 191 that frame 204 and container 206 underlie diaphragm 232. When the edges of sheet 219 are so retained and slide 214 is in open position, frame 204 is aligned with window 212 and may be exposed by actinic light passing therethrough. Then, sheet 219 may be so secured to slide 214 that when slide 214 is in closed position, area 228 and frame 204 are superposed. Under such circumstances, pressure-applying means of the type shown in Fig. 3 are adapted to act through diaphragm 232 to produce the compressional forces necessary to cause ejection of processing composition 208 from container 206 and spreading of the processing composition between frame 204 and area 228.

Edge portion 188 is provided with a passage 234 through which sheet 196 may be inserted into chamber 182 and through which sheets 196 and 219 may be removed from chamber 182. A cover 236, pivoted to edge portion 188 by such means as a flexible, opaque hinge 238, is provided for rendering passage 234 lighttight. Also provided are suitable light seal means 240 and suitable latch means 242.

The operation of the magazine of Figs. 8 and 9 is as follows. Cover 236 is opened in a dark room and sheet 196 is positioned in grooves 191. Cover 236 is closed and the magazine is predeterminedly positioned with respect to a suitable camera. Dark slide 214 is removed from chamber 182 via passage 216 and sheet 196 exposed. If sheet 219 now is mounted on slide 214, slide 214 may be moved into closed position so that frame 204 is aligned with area 228 and tab 202 with tab 226. Suitable pressure-applying means may be applied to diaphragm 232 in an illuminated environment in order to rupture the mouth of container 206 and to spread processing composition 208 between frame 204 and area 228. At the end of a predetermined period, during which the latent image in frame 204 has been processed and a positive print has formed in area 228, area 228 may be ripped from the remainder of sheet 219 and peeled from sheet 196.

Figure 10:
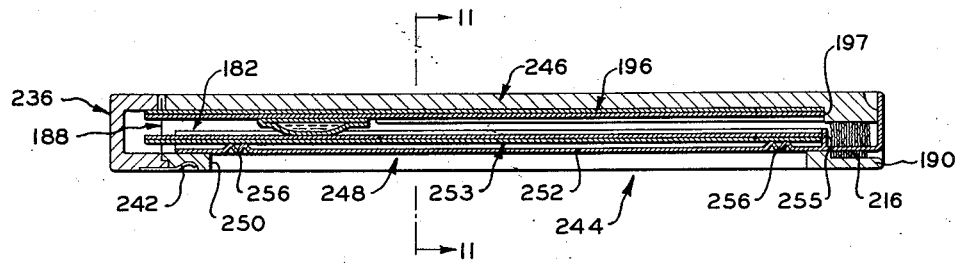
Fig. 10 is an exaggerated, sectional view of still another embodiment of the herein disclosed invention, the section being taken midway between the longitudinal edges thereof.
Figure 11:
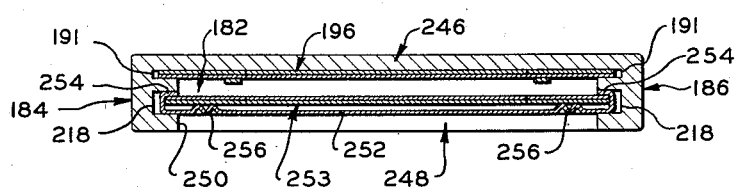
Fig. 11 is a cross-sectional view, taken substantially along the line 11—11 of Fig. 10.

Figs. 10 and 11 illustrate another magazine which embodies the present invention and which is similar to that shown in Figs. 9 and 10, like parts of said magazines being designated by like numerals.

Briefly, the magazine of Figs. 10 and 11 comprises a casing, generally designated at 244, which defines a chamber 182, and which includes edge portions 184, 186, 188 and 190, grooves 191 for receiving a photosensitive sheet 196, grooves 218, cover 236, and latch means 242, all of which are substantially similar to their counterparts in Figs. 8 and 9.

In the embodiment illustrated in Figs. 10 and 11, the rear face, designated at 246, is composed throughout of a rigid, durable, opaque material. The front face, designated at 248, provides an aperture 250 through which light is adapted to pass from the lens of a camera with which the magazine is associated to expose sheet 196.

A dark slide is provided, which, when in open position, permits transmission of light through aperture 250 to sheet 196 and, when in closed position, performs the functions of rendering aperture 250 light-tight, aligning an image-receiving sheet with a photosensitive sheet positioned within the casing, and enabling transmission of opposed compressional forces to the remote surfaces of said sheets from pressure-applying means on opposite sides of casing 244. In the illustrated embodiment, the dark slide is designated at 252. Edge portion 190 is provided with a lighttight passage 216 through which a portion of slide 252 normally extends and through which slide 252 may be removed from chamber 182. Grooves 218, which engage the edge portions of slide 252, serve to guide the slide into open and closed position. As shown, sheet 253, in conjunction with which photosensitive sheet 196 may be processed, is secured to the inner face of slide 252 as by means of inturned flanges 254. Viewing Fig. 10, movement of sheet 253 to the right with respect to slide 252 is limited by an abutment 255. As shown, slide 252 is composed of thin, resilient sheet metal, the central section of which is separated from the remainder thereof by a series of corrugations 256. Corrugations 256 are designed to permit forcing of the central section of slide 252 into chamber 182 without disturbing the edge sections of the slide. It is expressly to be understood that slide 252 alternatively may comprise a rigid frame and a flexible diaphragm composed of a material other than metal.

The operation of the embodiment illustrated in Figs. 10 and 11 is substantially similar to that of the embodiment illustrated in Figs. 8 and 9.

It is expressly to be understood that pressure-applying means other than those specifically illustrated may be employed in conjunction with a magazine embodying the present invention. Additional examples of suitable pressure-applying means are one or more blades of suitable shape movable along the opposed faces of the magazine and one or more platens movable perpendicularly to the opposed faces.

Broadly, a product embodying the present invention may employ a variety of photographic materials, including not only those related to silver halide but additionally, for example, such materials as diazo compounds and ferric salts. The term "processing composition" as used herein is intended to include any reagent which acts to render a visible image more visible, as in the case of ferric salts, or an invisible image visible, as in the case of silver halide emulsions. It is apparent that the invention is not limited to materials sensitive to visible and X-radiation but includes photographic materials sensitive to such other radiation as ultraviolet radiation, infrared radiation and penetrative radiation of the kind emanating from radioactive and fissionable materials.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A magazine for use in photography comprising a casing having a plurality of edge portions and a pair of opposed face portions, at least one of said face portions having an opening, a resilient diaphragm secured to said one of said face portions along the edges of said opening, at least one of said face portions providing a path for actinic radiation, said edge portions beign rigid, said casing defining a chamber within which a photosensitive sheet may be exposed and thereafter processed by spreading a processing composition between said photosensitive sheet and another sheet, a slide at least substantially coextensive with said path, one of a pair of opposed edge portions of said plurality having a passage through which said sheets may be inserted into and removed from said chamber, the other of said pair of opposed edge portions of said plurality providing a passage through which said slide may be inserted into and removed from said chamber, means for rendering said passages lighttight, said diaphragm maintaining said chamber lighttight in illuminated surroundings while transmitting opposed compressional forces into said chamber from pressure-applying means on opposite sides of said casing, whereby a layer of processing composition from said supply may be spread between adjacent surfaces of said photosensitive and other sheets.

2. A magazine comprising a casing having a plurality of edge portions and a pair of opposed face portions, at least one of said face portions including a resilient diaphragm, at least one of said opposed face portions providing a path for actinic radiation, said edge portions being rigid, said casing defining a chamber within which a photosensitive sheet may be exposed and processed by spreading a processing composition between said photosensitive sheet and another sheet, a first opposed pair of said edge portions providing first guide means within said chamber for locating said photosensitive sheet at a first predetermined position within said chamber, said first opposed pair of edge portions providing a second guide means within said chamber for locating said other sheet at a second predetermined position within said chamber, a slide at least substantially coextensive with said path, one of a second opposed pair of said edge portions providing a passage aligned with said first and second guide means through which said sheets may be moved into and out of said predetermined positions without bending, the other of said second opposed pair of edge portions providing a passage through which said slide may be inserted into and removed from said chamber, closure means for rendering said passages lighttight, said sheets when located in said predetermined positions being superposed, said diaphragm maintaining said chamber lighttight in an illuminated environment while transmitting compressional forces into said chamber from pressure-applying means on opposite sides of said casing.

3. A magazine for use in photography comprising a casing having a first paid of opposed edge portions, a second pair of opposed edge portions and a pair of opposed face portions, at least one of said pair of opposed face portions having an opening, at least one of said pair of opposed face portions providing a path for actinic radiation, a resilient light-opaque diaphragm secured to said one face portion along the edges of said opening, said edge portions being rigid, said casing defining a chamber within which a photosensitive sheet may be exposed and processed, said first pair of opposed edge portions providing a first pair of grooves within said chamber for receiving opposite edges of said photosensitive sheet, stop means for limiting movement of the edges of said photosensitive sheet in order to locate said photosensitive sheet at a first predetermined position within said chamber, said first pair of opposed edge portions providing a second pair of grooves within said chamber for receiving opposite edges of another sheet, stop means for limiting movement of the edges of said other sheet in order to locate said other sheet at a second predetermined position within said chamber, said photosensitive and other sheets when located in said first and second predetermined positions being superposed and underlying said path, a slide at least substantially coextensive with said path, one of said second pair of opposed edge portions providing a first passage aligned with said first and second pairs of grooves through which said sheets may be inserted into said chamber and removed from said chamber in superposed relation without bending, the other of said second pair of opposed edge portions providing a second passage through which said slide may be inserted into and removed from said chamber, closure means pivotally mounted on said one of said first pair of opposed edge portions for rendering said first passages lighttight, one of said sheets having attached thereto a container for carrying a predetermined quantity of processing compositio. said container having a rupturable mouth, said container and portions of said photosensitive and other sheets being in underlying relation with respect to said diaphragm when said photosensitive and other sheets are located in said predetermined positions, said diaphragm maintaining said chamber lighttight in an illuminated environment while transmitting opposed compressional forces into said chamber from pressure-applying means on opposite sides of said casing, whereby relative movement between said casing and said pressure-applying means is adapted to cause rupture of said mouth and spreading of a layer of said processing composition between said sheets.

4. A magazine for use in photography comprising a casing having a first pair of opposed edge portions, a second pair of opposed edge portions and a pair of opposed face portions, at least one of said face portions providing a path for actinic radiation, at least one of the said opposed face portions including a resilient diaphragm, said edge portions being rigid, said casing defining a chamber within which a photosensitive sheet may be exposed and processed, a slide at least substantially coextensive with said path, said first pair of opposed edge portions providing first guide means for locating said photosensitive sheet at a first predetermined position within said chamber and second guide means for locating another sheet at a second predetermined position within said chamber, one of said second pair of opposed edge portions providing a first passage aligned with said first and second guide means through which said sheets may be inserted into said chamber and removed therefrom without bending, the other of said second pair of opposed face portions providing a second passage through which said slide may be inserted into and removed from said chamber, means for rendering said passages lighttight, said photosensitive and other sheets when located in said first and second predetermined positions being superposed, a photosensitive sheet mounted in said first guide means, another sheet mounted in said second guide means, said photosensitive sheet providing a frame, said other sheet providing an image-receiving area, one of said sheets having attached thereto a container for carrying a predetermined quantity of processing composition, said image-receiving area being in alignment with said frame and said image-receiving area, said frame and said container being in underlying relation with respect to said diaphragm, said diaphragm maintaining said chamber lighttight in an illuminated environment while transmitting opposed compressional forces into said chamber from pressure-applying means on opposite sides of said casing, whereby relative movement between said casing and said pressure-applying means is adapted to cause rupture of said container and spreading of a layer of processing composition between said sheets.

5. A magazine for use in X-ray photography comprising a casing having edge portions and a pair of opposed face portions, at least one of said face portions including a resilient diaphragm, said edge portions being rigid, said casing defining a chamber within which a photosensitive sheet may be exposed and processed, said edge portions providing first guide means for locating said photosensitive sheet at a first predetermined position within said chamber and second guide means for locating another sheet at a second predetermined position within said chamber, said edge portions providing at least a passage aligned with said first and second guide means through which said sheets may be inserted into said chamber, means for rendering said passage lighttight, said photosensitive and other sheets when located in said first and second predetermined positions being superposed, one of said sheets having attached thereto a container for carrying a predetermined quantity of processing composition, said container having a rupturable mouth, said container and portions of said photosensitive and other sheets being in underlying relation with respect to said diaphragm when said photosensitive and other sheets are located in said predetermined positions, said edge portions providing a passage aligned with the region between said first and second predetermined positions, said last-mentioned passage being lighttight, and an intensifying screen movable through the last-mentioned passage into and out of said region, said container and portions of said photosensitive and other sheets being in underlying relation with respect to said diaphragm when said photosensitive and other sheets are located in said predetermined positions, at least one of said faces providing a path through which radiation may be transmitted in order to expose said photosensitive sheet, said diaphragm maintaining said chamber lighttight in an illuminated environment while transmitting opposed compressional forces into said chamber from pressure-applying means on opposite sides of said casing, whereby relative movement between said casing and said pressure-applying means is adapted to cause rupture of said mouth and spreading of a layer of said processing composition between said sheets.

6. A magazine for use in photography comprising a casing having edge portions and a pair of opposed face portions, at least one of said face portions including a resilient diaphragm, said edge portions being rigid, said casing defining a chamber within which a photosensitive sheet may be exposed and processed, said edge portions providing first guide means for locating said photosensitive sheet at a first predetermined position within said chamber and second guide means for locating another sheet at a second predetermined position within said chamber, said photosensitive and other sheets when located in said first and second predetermined poistions being superposed, said edge portions providing at least a passage aligned with said first and second guide means through which said sheets may be inserted into said chamber, means for rendering said passage lighttight, one of said sheets having attached thereto a container for carrying a predetermined quantity of processing composition, said container having a rupturable mouth, said container and portions of said photosensitive and other sheets being in underlying relation with respect to said diaphragm when said photosensitive and other sheets are located in said predetermined positions, an intensifying screen for intensifying the actinic effect of radiation striking said photosensitive sheet, said edge portions providing a lighttight passage through which said intensifying screen may be moved into the region between said first and second predetermined positions and through which said intensifying screen may be removed therefrom, at least one of said faces providing a path through which radiation may be transmitted in order to expose said photosensitive sheet, said diaphragm maintaining said chamber lighttight in an illuminated environment while transmitting opposed compressional forces into said chamber from pressure-applying means on opposite sides of said casing, whereby relative movement between said casing and said pressure-applying means is adapted to cause rupture of said mouth and spreading of a layer of processing composition between said sheets.

7. A magazine for use in photography comprising a casing having edge portions and a pair of opposed face portions, one of said face portions having an opening, a resilient diaphragm secured to said one face portion along the edges of said opening, the other of said face portions having an opening, a resilient diaphragm secured to said other face portion along the edges of said last-mentioned opening, said edge portions being rigid, said casing defining a chamber within which a photosensitive sheet may be exposed and processed, at least one of said edge portions having passage means therethrough by virtue of which said photosensitive sheet and another sheet may be inserted into said chamber, said sheets having associated therewith a supply of processing composition, means for rendering said passage means lighttight, at least one of said diaphragms providing a path through which radiation may be transmitted in order to expose said photosensitive sheet, said diaphragm being aligned so as to be adapted to transmit opposed compressional forces into said chamber from pressure-applying means on opposite sides of said casing, whereby a layer of processing composition from said supply may be spread between adjacent surfaces of said photosensitive and other sheets.

8. A magazine for use in X-ray photography comprising a casing having edge portions and a pair of opposed face portions, at least one of said face portions including a resilient diaphragm, said edge portions being rigid, said casing defining a chamber within which a photosensitive sheet may be exposed and processed, said edge portions providing first guide means for locating said photosentive sheet at a first predetermined position within said chamber and second guide means for locating another sheet at a second predetermined position within said chamber, an intensifying screen for intensifying the actinic effect of radiation incident upon said photosensitive sheet, third guide means for locating said intensifying screen between said first and second predetermined positions, said intensifying screen being removable from said chamber, said photosensitive and other sheets when located in said first and second predetermined positions being superposed, one of said sheets having attached thereto a container for carrying a predetermined quantity of processing composition, said container having a rupturable mouth, said container and portions of said photosensitive and other sheets being in underlying relation with respect to said diaphragm when said photosensitive and other sheets are located in said predetermined positions, at least one of said faces providing a path through which radiation may be transmitted in order to expose said photosensitive sheet, said diaphragm maintaining said chamber lighttight in an illuminated environment, said diaphragm, when said intensifying screen has been removed from said chamber, being adapted to transmit opposed compressional forces into said chamber from pressure-applying means on opposite sides of said casing, whereby relative movement between said casing and said pressure-applying means is adapted to cause rupture of said mouth and spreading of a layer of said processing composition between said sheets.

9. A magazine for use in photography comprising a casing having edge portions and a pair of opposed face portions, one of said face portions including a resilient diaphragm, the other of said face portions including another resilient diaphragm, said edge portions being rigid, said casing defining a chamber within which a photosensitive sheet may be exposed and processed, said edge portions providing first guide means for locating said photosensitive sheet at a first predetermined position within said chamber and second guide means for locating another sheet at a second predetermined position within said chamber, said photosensitive and other sheets when located in said first and second predetermined positions being superposed, said edge portions providing at least a passage aligned with said first and second guide means through which said sheets may be inserted into said chamber, means for rendering said passage lighttight, an intensifying screen for intensifying the actinic effect of radiation incident upon said photosensitive sheet, third guide means for locating said intensifying screen between said first and second predetermined positions, said edge portions providing a passage aligned with said third guide means through which said intensifying screen may be moved into and out of said chamber, means for rendering said last-mentioned passage lighttight, one of said sheets having attached thereto a container for carrying a predetermined quantity of processing composition, said container and portions of said photosensitive and other sheets being interposed between said diaphragm when said sheets are located in said predetermined positions, at least one of said diaphragms providing a path through which radiation may be transmitted in order to expose said photosensitive sheet, said diaphragms being adapted to maintain said chamber lighttight in an illuminated environment, said diaphragms being adapted to transmit opposed compressional forces into said chamber from pressure-applying means on opposite sides of said casing, whereby relative movement between said casing and said pressure-applying means is adapted to cause ejection of processing composition from said container and spreading of a layer of said processing composition between said sheets.

10. A magazine for use in photography comprising a casing having rigid edge portions and a pair of opposed face portions, said casing defining a chamber within which a photosensitive sheet may be exposed and processed, one of said face portions having an aperture, a dark slide which when in open position permits the passage of radiation through said aperture to expose said photosensitive sheet and which when in closed position renders said aperture lighttight, said dark slide including a resilient diaphragm, said diaphragm maintaining said chamber lighttight in illuminated surroundings while transmitting opposed compressional forces into said chamber from pressure-applying means on opposite sides of said casing, whereby a layer of processing composition may be spread over at least a surface of said photosensitive sheet.

11. A magazine for use in photography comprising a casing having edge portions and a pair of opposed face portions, said casing defining a chamber within which a photosensitive sheet may be exposed and processed, said edge portions providing passage means through which said photosensitive sheet and another sheet may be inserted into said chamber, said sheets having associated therewith a supply of processing composition, means for rendering said passage means lighttight, one of said face portions having an aperture, a dark slide, means on said edge portions for guiding said dark slide into an open and a closed position, said dark slide when in open position permitting passage of radiation through said aperture to expose said photosensitive sheet and when in closed position rendering said aperture lighttight, said dark slide including a resilient diaphragm, said diaphragm maintaining said chamber lighttight in illuminated surroundings while transmitting opposed compressional forces into said chamber from pressure-applying means on opposite sides of said casing, whereby a layer of processing composition from said supply may be spread between adjacent surfaces of said photosensitive and other sheets.

12. A magazine for use in photography comprising a lightweight casing having a first pair of opposed edge portions, a second pair of opposed edge portions and a pair of opposed face portions, said edge portions being rigid, said casing defining a chamber within which a photosensitive sheet may be exposed, first guide means on said first pair of opposed edge portions for locating said photosensitive sheet at a predetermined position within said chamber, one of said face portions providing a path for actinic radiation, one of said second pair of opposed edge portions providing a first passage, a dark slide extending through said first passage, second guide means on said first pair of opposed edge portions for constraining movement of said dark slide into an open and a closed position, said dark slide when in open position permitting the passage of light through said path to expose a photosensitive sheet located in said predetermined position and when in closed position rendering said path lighttight, third guide means on said dark slide for positioning another sheet at a predetermined position with respect thereto, said sheets being aligned when they are located in said predetermined positions and said dark slide is in closed position, the other of said second pair of opposed edge portions providing a passage aligned with said first guide means and said second guide means for inserting into and removing said photosensitive sheet and said other sheet from said chamber without bending, and means for rendering said passages lighttight.

13. A magazine for use in photography comprising a lighttight casing having a first pair of exposed edge portions, a second pair of opposed edge portions and a pair of opposed face portions, said edge portions being rigid, said casing defining a chamber within which a photosensitive sheet may be exposed, first guide means on said first pair of opposed edge portions for locating said photosensitive sheet at a predetermined position within said chamber, one of said face portions providing a path for actinic radiation, one of said second pair of opposed edge portions providing a first passage, a dark slide extending through said first passage, second guide means on said first pair of opposed edge portions for constraining movement of said dark slide into an open and a closed position, said dark slide when in open position permitting the passage of light through said path to expose a photosensitive sheet located in said predetermined position and when in closed position rendering said path lighttight, third guide means on said dark slide for securing another sheet to a face of said dark slide in a predetermined position with respect thereto, one of said sheets having attached thereto a processing composition container, the other of said face portions including a resilient diaphragm, said sheets being superposed and portions of said sheets together with said container underlying said diaphragm when said sheets are located in said predetermined positions and said dark slide is in closed position, said diaphragm being adapted to maintain said chamber lighttight in an illuminated environment while transmitting opposed compressional forces into said chamber from pressure-applying means on opposite sides of said casing, the other of said second pair of opposed edge portions providing a second passage aligned with said first guide means and said second guide means for inserting into and removing from said chamber said photosensitive sheet and said other sheet, and means for rendering said passages lighttight.

14. A magazine for use in photography comprising a lighttight casing having edge portions and a pair of opposed face portions, said edge portions being rigid, said casing defining a chamber within which a photosensitive sheet may be exposed, first guide means on said edge portions for locating said photosensitive sheet at a predetermined position within said chamber, one of said face portions having an aperture, a dark slide, second guide means on said edge portions for constraining movement of said dark slide into an open and a closed position, said dark slide when in open position permitting the passage of radiation through said aperture to expose a photosensitive sheet located in said predetermined position and when in closed position rendering said aperture lighttight, third guide means on said dark slide for securing another sheet to a face of said dark slide in a predetermined position with respect thereto, one of said sheets having attached thereto a processing composition container, said dark slide including a resilient diaphragm, said sheets being superposed and portions of said sheets together with said container underlying said diaphragm when said sheets are located in said predetermined positions and said dark slide is in closed position, said diaphragm being adapted to maintain said chamber lighttight in an illuminated environment while transmitting opposed compressional forces into said chamber from pressure-applying means on opposite sides of said casing.

15. A magazine for use in photography comprising a casing having a plurality of edge portions and a pair of opposed face portions, at least one of said face portions having an opening, a resilient diaphragm covering said opening, at least one of said face portions providing a path for actinic radiation, said edge portions being rigid, said casing defining a chamber within which a photosensitive sheet may be exposed and thereafter processed by spreading a processing composition between said photosensitive sheet and another sheet, a slide providing an intensifying screen at least substantially coextensive with said path, one of a pair of opposed edge portions of said plurality having a passage through which said sheets may be inserted into and removed from said chamber, the other of said pair of opposed edge portions of said plurality providing a passage through which said slide may be inserted into and removed from said chamber, said diaphragm maintaining said chamber lighttight in illuminated surroundings while transmitting opposed compressional forces into said chamber from pressure-applying means on opposite sides of said casing whereby a layer of processing composition from said supply may be spread between adjacent surfaces of said photosensitive and other sheets.

16. A magazine comprising a casing having a plurality of edge portions and a pair of opposed face portions, at least one of said face portions including a resilient diaphragm, at least one of said opposed face portions providing a path for actinic radiation, said edge portions being rigid, said casing defining a chamber within which a photosensitive sheet may be exposed and processed by spreading a processing composition between said photosensitive sheet and another sheet, a first opposed pair of said edge portions providing first guide means within said chamber for locating said photosensitive sheet at a predetermined position within said chamber, said first opposed pair of edge portions providing second guide means within said chamber for locating said other sheet at a second predetermined position within said chamber, a slide providing an intensifying screen at least substantially coextensive with said path, one of a second opposed pair of said edge portions providing a passage aligned with said first and said second guide means through which said sheets may be moved into and out of said predetermined positions without bending, the other of said second opposed edge portions providing a passage through which said slide may be inserted into and removed from said chamber, closure means for rendering said passages lighttight, said sheets, when located in said predetermined positions, being superposed, said diaphragm maintaining said chamber lighttight in an illuminated environment while transmitting compressional forces into said chamber from pressure-applying means on opposite sides of said casing.

References Cited in the file of this patent

UNITED STATES PATENTS

| | | |
|---|---|---|
| 653,383 | Gates | July 10, 1900 |
| 2,371,843 | Powers | Mar. 20, 1945 |
| 2,500,422 | Land | Mar. 14, 1950 |
| 2,565,378 | Land | Aug. 21, 1951 |
| 2,600,064 | McCune | June 10, 1952 |
| 2,659,825 | Land | Nov. 17, 1953 |
| 2,709,223 | Bachelder et al. | May 24, 1955 |
| 2,726,337 | Stava et al. | Dec. 6, 1955 |